3,156,753
MELTING FURNACE FOR METALS
Helmut Gruber, Hanau, Germany, assignor to W. C. Heraeus G.m.b.H., Hanau (Main), Germany, a corporation of Germany
Filed Sept. 19, 1961, Ser. No. 139,302
1 Claim. (Cl. 13—9)

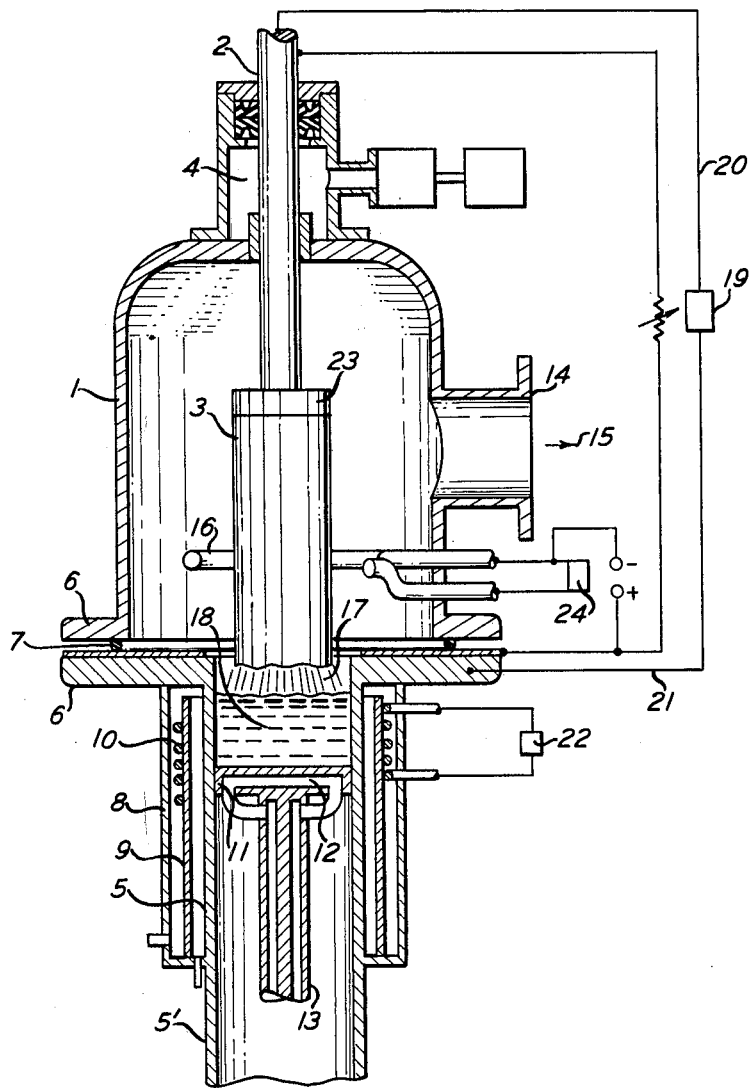

The present invention relates to a melting furnace for metals which operates under a reduced pressure. The advantage of melting metals under a reduced pressure is that it permits the quality of the metal to be considerably improved since, by being subjected to a vacuum, the molten metal will be degassed. For carrying out such a melting operation, numerous types of melting apparatus have already been proposed which operate according to one or another of three basically different melting methods and are designed to extend and to improve these methods. These three basic melting methods are the inductive method, the arc method, and the electron method. In accordance with this classification, the metals are heated to the melting temperature under a reduced pressure or vaccum either by electric induction, by means of an electric arc, or by a bombardment with electrons. When employing either of the two last-mentioned methods, the metal to be melted is usually applied in the form of a rod-shaped electrode which is gradually melted and is usually called a consumable electrode.

The desired quality of the final product usually depends upon which of these melting methods is applied, that is, whether the melting process is carried out under a vacuum in an induction furnace, in an electric arc furnace, or in an electron furnace. Prior to this invention, each melting process by either of these methods had to be carried out in a separate furnace. For attaining very pure metals, it has also already been proposed to carry out two melting processes successively by either subjecting the metal twice to the same melting method or to two different methods.

The melting apparatus which are known for carrying out two different melting methods successively consist of two furnace units which are preferably arranged above each other so that the block of metal attained after the first melting process by one method is thereafter moved into a second furnace unit where it is again melted by the other melting method. Such melting apparatus which operate under a reduced pressure are not only extremely expensive and require considerable space, but their operation and maintenance are also very difficult.

It is an object of the present invention to provide a melting apparatus which operates under a reduced pressure and which is distinguished from similar melting apparatus of the types as above described by forming only a single furnace unit which combines the functions of a conventional electric arc furnace which operates under a reduced pressure with those of a conventional electron furnace which also operates under a reduced pressure. The melting apparatus according to the invention has the great advantage over the known double arrangement that its operation and maintenance is considerably simplified since the essential control and operating apparatus thereof are designed to permit them to be employed for carrying out either the electric arc or the electron melting method. The one-unit melting apparatus according to the invention has the further important advantage that its costs of construction as well as of its operation and maintenance are considerably lower than those of a two-unit apparatus. Furthermore, the vacuum melting apparatus according to the invention permits the two different melting methods, that is, the electric arc and electron melting methods, to be combined with each other in any desired order or manner, for example, by first melting the consumable electrode by heating it by an electric arc and by then employing the block of metal thus produced again as a consumable electrode in order to melt the metal for the second time by means of electron beams.

The above mentioned as well as other objects, features, and advantages of the present invention will become more clearly apparent from the following detailed description thereof, particularly when the same is read with reference to the accompanying drawing which illustrates diagrammatically and largely in cross section a melting plant according to the invention.

As shown in the drawing, the furnace chamber 1 of the melting apparatus according to the invention contains an electrode supporting rod 2 on which a consumable electrode 3 is secured and which is inserted into the furnace chamber 1 through several vacuum stages 4, only one of which is shown diagrammatically to simplify the illustration. The crucible 5 of the furnace is secured to the furnace chamber 1 by flanges 6 between which one or more suitable sealing gaskets 7 are provided. Crucible 5 is surrounded by a cooling jacket 8 forming a cooling chamber in which a partition 9 is provided on which a field coil 10 is mounted. Crucible 5 has a bottom 11 which is adapted to be raised and lowered by suitable means, not shown, and which is likewise provided with cooling means, for example, in the form of cooling channels 12. The means for raising and lowering the crucible bottom 11 may consist, for example, of a conventional mechanical or hydraulic elevating mechanism. The rod or plunger 13 carrying the crucible bottom 11 is preferably disposed within a lower extension 5' of the crucible and is maintained also under a reduced pressure. Furnace chamber 1 is connected through a pipe 14 to a pump unit as indicated by the arrow 15, which is of a dimension so as to be capable of maintaining the furnace chamber at all times during the melting process under the required vacuum for insuring that the molten metal will be effectively degassed. Furnace chamber 1 contains an electron source, for example, in the form of a heating ring 16 which, however, may also be replaced by several electron generators which are preferably distributed evenly at the same height as heating ring 16 around the consumable electrode 3. Heating ring 16 or the electron generators should be spaced at such a distance from the consumable electrode 3 that luminous discharges between them will be absolutely avoided.

The melting apparatus according to the invention as above described, may be employed to carry out a combined electric-arc and electron melting process in the following manner:

After the furnace chamber 1 has been evacuated by pump 15, the consumable electrode 3 on the supporting rod 2 is lowered into crucible 5. The crucible bottom 11 is then lowered to such an extent that, while the first melting process is being carried out by the arc 17 burning between the electrode rod 3 and the pool 18 of molten metal, arc 17 will be disposed within the crucible 5. The amount of energy which is required for carrying out the arc melting process is supplied by a high-current unit 19 through the conductors 20 and 21. The electrode supporting rod 2 is lowered gradually and continuously into furnace chamber 1 by suitable means, not shown, in accordance with the consumption of the electrode 3 and the amount of metal melted off therefrom. During the melting process the field coil 10 is preferably connected to a source of current 22. Its magnetic field has the purpose of stabilizing the arc 17 and to exert a stirring effect within the pool of molten metal 18.

After the arc melting process has been completed, the end portion 23 of the supporting rod 2 is immersed into the molten metal so that, when the latter has cooled off sufficiently to solidify, the supporting rod 2 will be firmly connected to the metal block which is then formed. Supporting rod 2 is then drawn up together with the metal block so that the latter will be disposed within furnace chamber 1 and its lower end will be surrounded by the heating ring 16, as shown, or by several electron generators. During the following electron melting process the metal block will then again be utilized as a consumable electrode. Heating ring 16 which may consist, for example, of a heated tungsten cathode which may or may not be thoriated or of an oxide or boride cathode, is then connected to the current source 24. The focused electrons emitted from this cathode are accelerated by a suitable voltage distribution so as to impinge upon and melt off the lower end of the consumable electrode 3. The molten metal then drops into the cooled crucible 5 where it again forms a pool. This pool is maintained in a liquid condition by the electrons which are emitted from the falling drops of metal or from the lower end of the consumable electrode. The crucible bottom 11 is then continuously lowered in accordance with the amount of molten metal so that the surface of the pool will always remain at substantially the same level. The speed at which the consumable electrode 3 is lowered may be controlled in the conventional manner so that the lower end of the consumable electrode 3 will be surrounded by the heated cathode during the entire melting process. When employing electron generators in place of the heating ring 16, the lower end of the consumable electrode 3 will at all times during the melting process be disposed within the point of intersection of the electron beams which are directed upon the consumable electrode and the central axes of which are only slightly downwardly inclined. For accelerating the electrons, the consumable electrode 3 and crucible 5 are connected during the entire electron melting process to a high positive potential, that is, crucible 5 to a higher potential than the consumable electrode, while the heated cathode is connected to a negative potential.

The melting apparatus according to the invention therefore permits the following melting processes to be carried out:

(1) Electric arc melting under a vacuum;
(2) Electron melting under a vacuum; and
(3) Electric arc melting followed by electron melting, both under a vacuum, or vice versa.

Thus, while previously two separate melting furnaces were required, it is now possible according to the invention to carry out all three melting processes in a single melting unit. It is obvious that this constitutes a great technical improvement and that it considerably reduces the cost of constructing as well as operating such melting apparatus.

Although my invention has been illustrated and described with reference to the preferred embodiment thereof, I wish to have it understood that it is in no way limited to the details of such embodiment, but is capable of numerous modifications within the scope of the appended claim.

Having thus fully disclosed my invention, what I claim is:

A method of melting metals within a furnace under a reduced pressure comprising the steps of first melting a consumable electrode connected to a supporting rod within an evacuated furnace chamber into a crucible by means of an electric arc, then lowering the end of said supporting rod from which said consumable electrode has been melted off into the molten metal within said crucible and allowing the metal to solidify so as to be connected to said rod, then elevating said rod with said solidified metal and thereby lifting said metal from said crucible into said furnace chamber, and then again melting said metal within said chamber into said crucible by electron bombardment.

References Cited by the Examiner

UNITED STATES PATENTS

| 2,300,355 | 10/42 | Ellefsen | 13—34 |
| 2,473,681 | 6/49 | Hansen | 13—34 |
| 2,782,245 | 2/57 | Preston | 13—9 |
| 2,880,483 | 4/59 | Hanks et al. | |
| 2,978,525 | 4/61 | Gruber et al. | 13—9 |

FOREIGN PATENTS 803,746  10/58  Great Britain.

RICHARD M. WOOD, *Primary Examiner.*

JOSEPH V. TRUHE, ANTHONY BARTIS, *Examiners.*